UNITED STATES PATENT OFFICE.

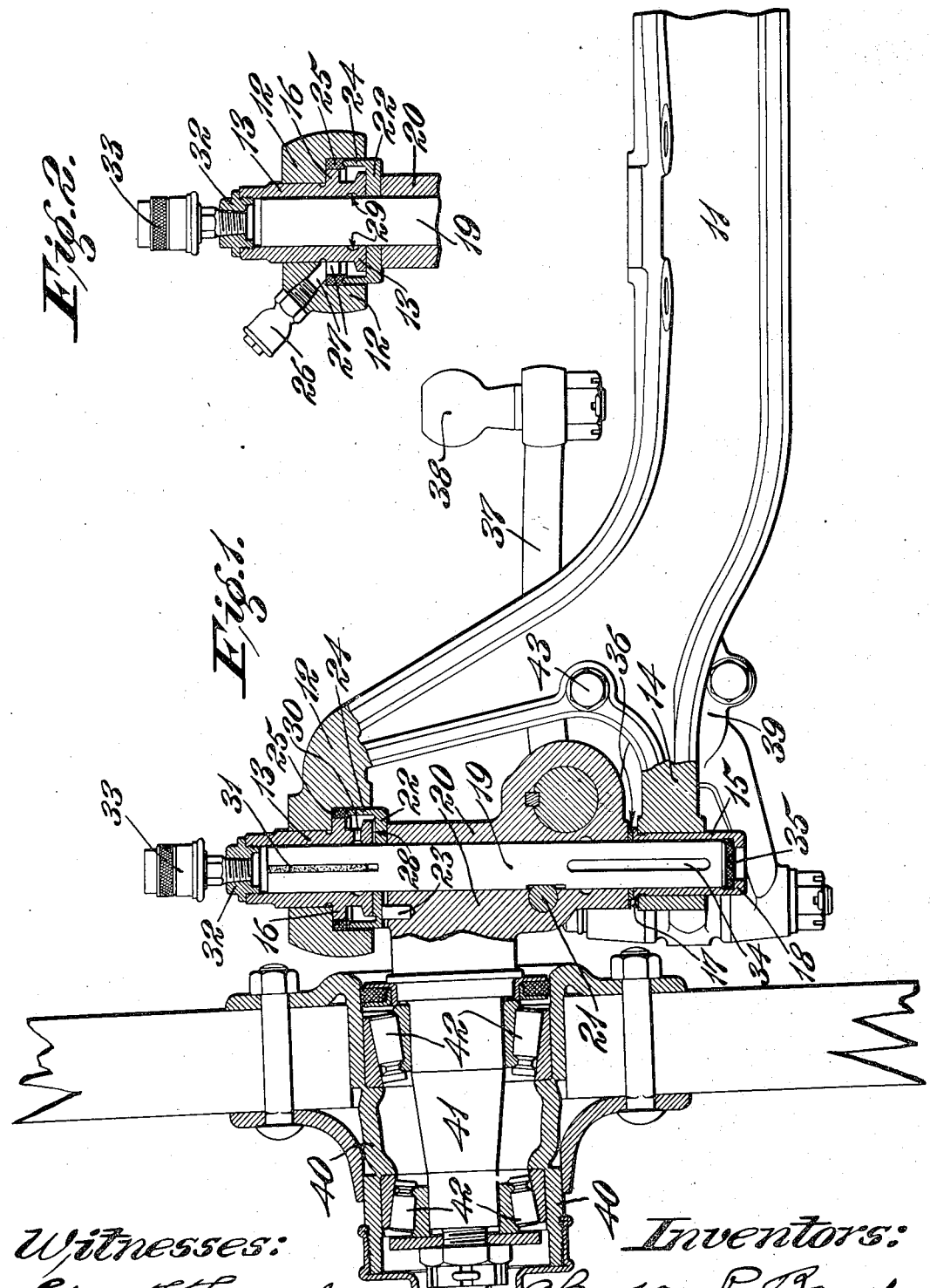

HERBERT W. ALDEN AND ALANSON P. BRUSH, OF DETROIT, MICHIGAN, ASSIGNORS TO THE TIMKEN-DETROIT AXLE COMPANY, OF DETROIT, MICHIGAN, A CORPORATION OF OHIO.

AUTOMOBILE-STEERING-AXLE HEAD.

1,166,649.　　　　Specification of Letters Patent.　　Patented Jan. 4, 1916.

Application filed June 28, 1915. Serial No. 36,816.

*To all whom it may concern:*

Be it known that we, HERBERT W. ALDEN and ALANSON P. BRUSH, citizens of the United States, and residents of the city of Detroit, county of Wayne, and State of Michigan, have invented a new and useful Improvement in Automobile-Steering-Axle Heads, of which the following is a specification.

This invention relates particularly to pivot bearings for steering knuckles of automobile axles, and the object of the invention is a plain pivot and thrust bearing which can be kept immersed in oil.

A further object of the invention is to facilitate assembling the device and accuracy of adjustment of the parts.

Other objects of the invention appear hereinafter in connection with the description of the embodiment of the invention which is illustrated in the accompanying drawings, and the invention is more particularly defined in the appended claims.

In the drawings, wherein the same reference characters are used to designate the same parts in both views, Figure 1 is a front elevation of the end of an automobile steering axle, showing the steering head and knuckle and road wheel hub partly in cross-section, the section being taken in a vertical plane through the axis of the steering pivot and wheel spindle; and Fig. 2 is a sectional view of the top branch of the axle head in a vertical plane at right angles to the plane of Fig. 1, showing the oil cups in side elevation.

The axle 11 has a forked steering head consisting of an upper branch 12, which is fited with a hardened steel bushing 13 vertically arranged therein, and a lower branch 14, which is fitted with a hardened steel bushing 15 in vertical alinement with the bushing 13. The upper bushing 13 is provided with an external shoulder 16 near its lower end, and it is pressed tightly up into a hole in the upper branch of the axle until the shoulder 16 bears against the end wall of the counterbored lower end of the hole. The lower end of the upper bushing 13 is finished with a flat bearing surface. The lower bushing 15 has an outwardly projecting flange 17 around its top and an inwardly projecting flange 18 within its lower end. The lower bushing is pressed down into a hole in the lower branch 14 until the top flange 17 bears on the top face of the lower branch of the axle head. The bushings 13 and 15 are bored out to receive the hardened steel pivot pin 19 upon which the steering knuckle 20 is secured, and which rotates in the bushings when the steering knuckle turns. The pin 19 has a driving fit in the hole through the knuckle, and is secured in place therein with its ends projecting into the bushings 13 and 15 by a taper pin 21. A cup shape thrust bearing 22 is driven on to the upper end of the pivot pin and seats on the top face of the steering knuckle. A fixed pin 23 in the top face of the steering knuckle projects into a slot on the under side of the thrust bearing 22 and secures it against rotation on the spindle. The outer flange 24 of the cup shape thrust bearing projects up into the counterbored lower end of the hole through the upper branch 12 of the axle head. A felt or leather washer 25 is arranged between the upper edge of the flange 24 and the end of the hole to prevent dust from entering the bearing around the outer edge of the flange, and to retain the lubricating oil in the bearing. The space within the cup shape thrust bearing 22 and outside of the end of the bushing 13 forms an oil reservoir, and may be filled with oil from the oil cup 26, which is mounted on the upper branch of the axle head. Alining passages 27 through the axle head and shoulder 16 of the bushing 15 conduct oil to this oil reservoir in the cup shape bearing 22, and one or more radial grooves 28 in the thrust bearing surface 22 distribute the oil between the thrust bearing and lower face of the bushing 13. A groove 29 around the inside of the bushing 13 near its lower end and connected with the oil reservoir in the cup shape thrust bearing 22 by means of a passage 30 keeps the lower end of the bushing and spindle side thrust bearing flooded with oil. The upper end of the pin 19 has a vertical slot on its front side in which a felt strip 31 is arranged. This felt strip acts as a wick to keep the upper end of the spindle and bushing 13 well supplied with oil. The bushing 13 has a cap 32 screwed into its top opening, and a grease cup 33 is carried by the cap from which an additional supply of lubricant is fed to the upper pivot bearing. The lower end of the pivot pin 19 has a vertical groove 34 along one side of it, extending nearly through the lower bushing 15. The steering knuckle has a groove around the pin 19 near the upper end of the vertical groove 34 therein, and a passage through the knuckle leads to a grease cup on the lower end of the knuckle from which lubricant is supplied to the lower pivot pin bearing and bushing 15. The bushing 15 has a leather or felt washer 35 in its lower end to retain the oil and grease in the lower pivot pin bearing and to prevent dust and dirt from working into the bearing through the hole in the lower end of the bushing 15. A spacing washer 36 is arranged between the lower face of the steering knuckle and the top face of the top flange 17 of the lower bushing 15.

In assembling the steering knuckle and pivot pin the upper and lower bushings are forced into the branches of the axle head and the cup shape thrust bearing and the steering knuckle are assembled in position without the pivot pin. The space left for the washer 36 is then very carefully measured and a washer of the proper thickness to fill said space is inserted, whereupon the pivot pin is driven home and keyed in place by the taper pin 21. This method of assembling the parts insures an accurate fit in spite of slight inaccuracy in facing off the upper and lower surfaces of the branches of the axle head and the top and bottom faces of the steering knuckle.

The steering knuckle is fitted with the usual operating arm 37 which has a ball 38 for the connection to the steering mechanism, and a yoke and pin connection to the cross rod 39 which connects it to the opposite steering knuckle. The wheel hub 40 is rotatably mounted on the spindle 41 of the steering knuckle by means of adjustable tapered roller bearings 42 in a well known manner. An adjustable stop screw 43 is provided at the end of the axle for limiting the angular swinging movement of the steering knuckle.

The advantages of the foregoing construction lie in having a well lubricated small plain bearing surface between the knuckle and upper bushing to take the thrust on the axle head, and in keeping the cylindrical side thrust bearing above it well lubricated at all times, thus enabling antifriction bearings at this point to be dispensed with, and in keeping this bearing submerged in oil without requiring any but occasional attention.

The invention is not restricted to the shapes and dimensions of the parts shown and described above, nor to the arrangement of parts shown and described.

We claim the following as our invention:

1. An axle steering head and pivoted steering knuckle construction comprising a forked axle, bushings arranged in axial alinement in said forks, a pivot pin rotatably mounted in said bushings, said pivot pin being secured in the axle knuckle, and a cup shaped thrust bearing member secured on said pivot pin between said knuckle and the upper one of said bushings, the rim of said bearing member inclosing the lower end of said bushing and with a space between it and said bushing constituting an oil reservoir.

2. An axle steering head and pivoted steering knuckle construction comprising a forked axle, the upper fork having a hole through it, the lower end of said hole being counterbored to a larger diameter, a bushing arranged in said hole, the lower end of said bushing constituting a thrust bearing, a bushing in the lower fork of said axle in axial alinement with said first mentioned bushing, a pivot pin rotatably mounted in said bushings, said pivot pin being secured in the axle knuckle, and a cup shaped thrust bearing member secured on said pivot pin between said knuckle and the upper one of said bushings, the rim of said bearing member projecting into the enlarged lower end of said hole and inclosing the lower end of said bushing with a space between it and said bushing constituting an oil reservoir, and a washer between the upper edge of said rim and the inner wall of the enlarged portion of said hole.

3. An axle steering head and pivoted steering knuckle construction comprising a forked axle, the upper fork having a hole through it, the lower end of said hole being counterbored to a larger diameter, a bushing arranged in said hole, the lower end of said bushing constituting a thrust bearing, a bushing in the lower fork of said axle in axial alinement with said first mentioned bushing, a pivot pin rotatably mounted in said bushings, said pivot pin being secured in the axle knuckle, and a cup shaped thrust bearing member secured on said pivot pin between said knuckle and the upper one of said bushings, the rim of said bearing member projecting into the enlarged lower end of said hole and inclosing the lower end of said bushing with a space between it and said bushing constituting an oil reservoir, a washer between the upper edge of said rim and the inner wall of the enlarged portion of said hole, and means for supplying lubricant to said oil reservoir.

4. An axle steering head and pivoted steering knuckle construction comprising a forked axle, bushings arranged in axial alinement in said forks, a pivot pin rotatably mounted in said bushings, said pivot pin being secured in the axle knuckle, and a cup shaped thrust bearing member secured on said pivot pin between said knuckle and the upper one of said bushings, the rim of said bearing member inclosing the lower end of said bushing and with a space between it and said bushing constituting an oil reservoir, the upper end of said pin having a longitudinal oil groove therein extending below the top edge of said rim, and a wick in said groove for conducting oil to the upper end of said bushing from said reservoir.

5. An axle steering head and pivoted steering knuckle construction comprising a bushing fixed in the end of said axle, a pivot pin fixed in said knuckle, a thrust bearing surface movable with said knuckle and bearing against the end of said bushing, a cup formed in one of said members and surrounding said thrust bearing surface and projecting above the latter, means coöperating with the rim of said cup for keeping dirt out of said cup, and means for supplying lubricant to said cup whereby said thrust bearing surface may be kept submerged in oil.

6. An axle steering head and pivoted steering knuckle construction comprising a forked axle head having alining holes through its top and bottom branches, bushings in said holes, the upper bushing having a flange bearing against an under face of said top branch and the lower bushing having a flange bearing against an upper face of said bottom branch, a steering knuckle arranged between said top and bottom branches and having a hole through it in alinement with said bushings, a pin journaled in said bushings, said pin being secured in the steering knuckle, a thrust bearing on said knuckle adapted to bear against the upper one of said bushings, and a washer filling the space between said knuckle and lower bushing, said washer being secured in place by said pin.

7. An axle steering head and pivoted steering knuckle construction comprising a forked axle head having alining holes through its top and bottom branches, bushings in said holes, the upper bushing having a flange bearing against an under face of said top branch and the lower bushing having a flange bearing against an upper face of said bottom branch, a steering knuckle arranged between said top and bottom branches and having a hole through it in alinement with said bushings, a pin journaled in said bushings and removable endwise therefrom, said pin being removably secured in the steering knuckle, a thrust bearing on said knuckle adapted to bear against the upper one of said bushings, and a washer filling the space between said knuckle and lower bushing, said washer being removably secured in place by said pin.

8. An axle steering head and pivoted steering knuckle construction comprising a forked axle head having alining holes through its top and bottom branches, bushings in said holes, the upper bushing having a flange bearing against an under face of said top branch and the lower bushing having a flange bearing against an upper face of said bottom branch, a steering knuckle arranged between said top and bottom branches and having a hole through it in alinement with said bushings, a pin journaled in said bushings, said pin being secured in the steering knuckle, a thrust bearing on said knuckle adapted to bear against the upper one of said bushings, and a washer filling the space between said knuckle and lower bushing, said washer being secured in place by said pin, and an internal flange at the bottom end of said lower bushing upon which is removably supported an absorbent washer for normally closing the lower end of said bushing against entrance of dirt and leakage of oil.

Signed at Detroit. Michigan, this 24th day of June, 1915.

H. W. ALDEN.
ALANSON P. BRUSH.